US006847945B1

(12) United States Patent
Jarvis et al.

(10) Patent No.: US 6,847,945 B1
(45) Date of Patent: Jan. 25, 2005

(54) METHOD FOR CONDUCTING A FINANCIAL ANALYSIS

(75) Inventors: Colin Jarvis, Billericay (GB); Daphne Wakefield, Dexter, MI (US); Janis Haag, Pinckney, MI (US); Nam Thai-Tang, Farmington Hills, MI (US); Manfred Wajroch, Lohmar (DE); Peter Przybocki, Canton Township, MI (US); Serguei A. Lougovier, Westland, MI (US); Michael R. Mei, Livonia, MI (US)

(73) Assignee: Ford Motor Company, Dearborn, MI (US)

( * ) Notice: Subject to any disclaimer, the term of this patent is extended or adjusted under 35 U.S.C. 154(b) by 642 days.

(21) Appl. No.: 09/662,582

(22) Filed: Sep. 15, 2000

(51) Int. Cl.⁷ .............................................. G06F 17/60
(52) U.S. Cl. .......................................... 705/36; 705/10
(58) Field of Search ............................... 705/35, 36, 7, 705/8, 9, 10; 707/10, 509

(56) References Cited

U.S. PATENT DOCUMENTS

| | | | | |
|---|---|---|---|---|
| 4,989,141 A | * | 1/1991 | Lyons et al. | 705/36 |
| 5,233,533 A | * | 8/1993 | Edstrom et al. | 700/103 |
| 6,321,205 B1 | * | 11/2001 | Eder | 705/7 |
| 6,457,049 B2 | * | 9/2002 | Lewis et al. | 709/223 |
| 6,477,434 B1 | * | 11/2002 | Wewalaarachchi et al. | 700/83 |

FOREIGN PATENT DOCUMENTS

JP          9-218897        *   9/1997

OTHER PUBLICATIONS

Yasmin, M. et al., A profile of successful US Manufactures, Industrial Management & Data Systems, v95n10, 1995, pp. 8–18.*

* cited by examiner

*Primary Examiner*—James S. McClellan
(74) *Attorney, Agent, or Firm*—David B. Kelley

(57) ABSTRACT

A method is disclosed for conducting a financial analysis. The method includes creating a financial analysis utility having a standardized format, and providing access through a communication network to the financial analysis utility to employees of a business enterprise. Thus, the present invention provides a single source for the financial analysis utility.

7 Claims, 6 Drawing Sheets

METHOD FOR CONDUCTING A FINANCIAL ANALYSIS

TECHNICAL FIELD

The present invention relates to methods for analyzing financial data in a large business enterprises.

BACKGROUND ART

Large business enterprises employ thousands of people, many of whom are involved in conducting financial analysis for the business enterprise. Some of these employees may be full-time financial analysts, and others may need to conduct financial analysis only occasionally. However, it is critical that any financial analysis conducted within a business enterprise is predicated on the same set of data, assumptions, and rules. This ensures that financial information may be shared between employees, skills are transferred, and best practices are employed.

Prior art methods for conducting financial analysis within large business enterprises have not utilized uniform business processes for conducting financial analysis. What is most prevalent in large business enterprises are multiple and varied methods for conducting financial analysis. Typically, the multiple methods use a plurality of data sources, varied assumptions, and differing rules. The result is that employees in one area of a business enterprise are not able to communicate the financial analysis in a compatible and understandable manner with other financial analysts in other parts of the company.

Therefore, there is a need for a new and improved system and method for conducting financial analysis within a large business enterprise. The new and improved system and method for conducting financial analysis must provide a common process for conducting financial analysis wherein the process is accessible by all the employees within the business enterprise.

DISCLOSURE OF INVENTION

In accordance with an aspect of the present invention a method is provided for conducting a financial analysis. The method includes creating a financial analysis utility having a standardized format, and providing access through a communication network to the financial analysis utility to employees of a business enterprise. Thus, the present invention provides a single source for the financial analysis utility.

In accordance with another aspect of the present invention, the method further includes creating a rules table for use with the financial analysis utility.

In accordance with still another aspect of the present invention, the rules table matches a user input with a predefined rule to obtain a rate.

In accordance with still another aspect of the present invention, the financial analysis utility is in communication with a database having actual and forecasted financial values.

In accordance with still another aspect of the present invention, the financial analysis utility is an exchange rate tool.

In accordance with yet another aspect of the present invention, the financial analysis utility is a volume extension tool.

In accordance with yet another aspect of the present invention, the financial analysis utility is a allocation tool.

In accordance with yet another aspect of the present invention, the financial analysis utility is an aggregation/average tool.

In accordance with yet another aspect of the present invention, the financial analysis utility is an variance tool.

In accordance with yet another aspect of the present invention, a method is provided for conducting a financial analysis. The method includes creating a financial analysis utility having a standardized format, the standardized format includes a rules table for use with the financial analysis utility and providing access through a communication network to the financial analysis utility to employees of a business enterprise to establish a single source for the financial analysis utility.

The above features, benefits and advantages and other features, benefits and advantages of the present invention are readily apparent from the following detailed description of the best mode for carrying out the invention when taken together with the accompanying drawings.

BEST MODE FOR CARRYING OUT THE INVENTION

Figure 1:
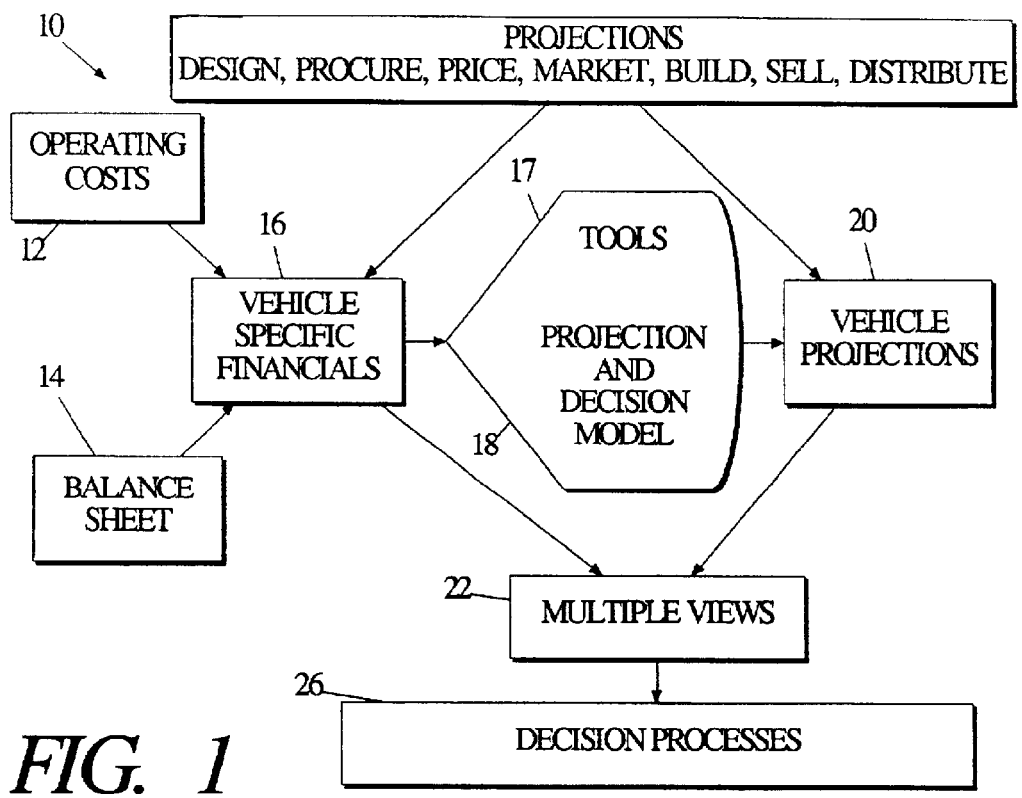
FIG. 1 is a block diagram of a system and method for calculating vehicle projections, in accordance with the present invention.

Reference is now made to FIG. 1 which is a diagrammatic representation of a financial analysis utility 10 for calculating vehicle financial projections. Utility 10 receives operating costs 12 and balance sheet information 14 as system inputs to create vehicle specific financials 16. Vehicle specific financials are received by common tools 17, projection and decision models 18 which generate vehicle financial projections 20. The vehicle financial projections 20 and the vehicle specific financials 16 are transformed into multiple views 22. The vehicle financial projections 20 and the vehicle specific financials 16 are presented in different views for use in decision processes 26.

The balance sheet information 14, typically, contains net operating assets and other asset information. Additionally, balance sheet 14 has cash contribution and full cash flow information as well. Operating costs 12 (period expense) includes labor and overhead, engineering, administrative and selling costs. Preferably, vehicle actuals and vehicle financial projections include net revenue, material cost, outbound freight, warranty, etc. Generally, projections include period expense projections, balance sheet projections, and input from vehicle projections. Common tools 17 include allocation of actual and forecast period expense, exchange rate conversion, variance analysis, average vehicle calculations, and volume extension.

Figure 2:
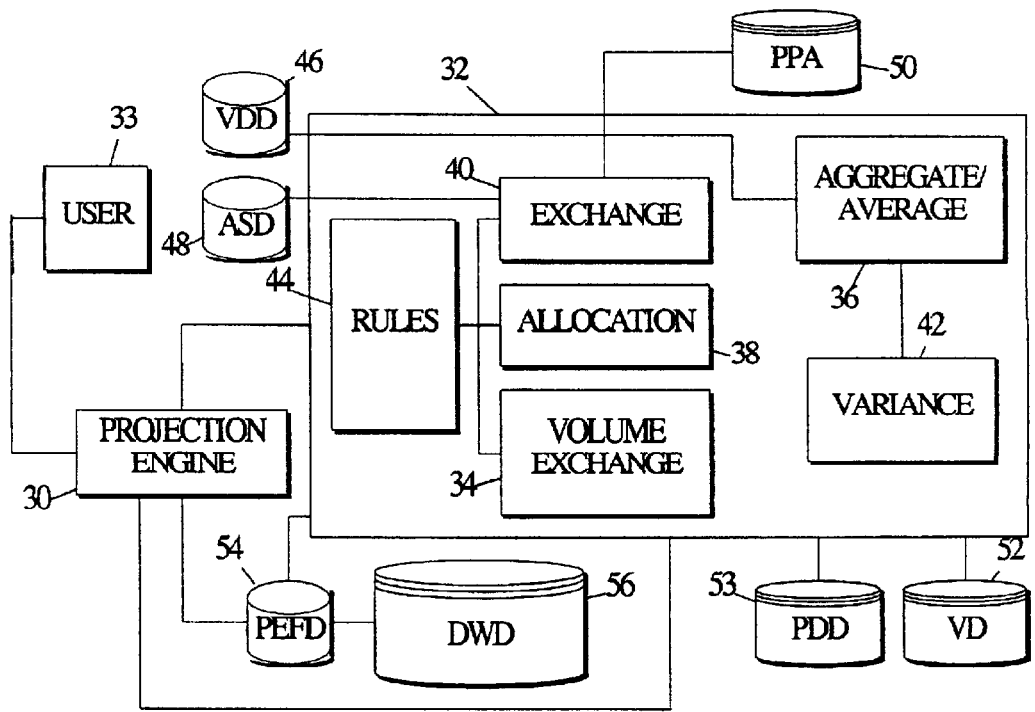
FIG. 2 is a block diagram illustrating the interaction of a projection engine with a toolbox, in accordance with the present invention.

Referring now to FIG. 2, a block diagram illustrating the interaction of a projection engine 30 with a toolbox 32 is illustrated, in accordance with the present invention. Preferably, a user 33 actuates projection engine 30 to work with actuals, forecast assumptions, and physical assumptions. Projection engine 30 calls toolbox 32 to provide user 33 with the vehicle projections. Toolbox 32 includes multiple common tools 17 for calculating vehicle projections. Preferably, toolbox 32 includes a volume extension tool 34, aggregation/average tool 36, an allocation tool 38, an exchange rate tool 40 and a variance tool 42 however, other tools may be added. Toolbox 32 has a standardized format which includes a set of rules 44 and the set of common tools 17.

The set of rules 44 dictate how each tool is used with the inputs to the projection engine 30. Preferably, the set of rules exists in a look-up table configuration wherein, inputs received from the projection engine are matched with an appropriate predefined rule or "rate". The "rate" is then used with the inputs to perform the desired calculations.

Further, a plurality of databases are connected to the toolbox 32 for providing data to each of the common tools 17 to carry out the respective calculations requested by the projection engine 30. For example, the aggregation/average tool 36 is connected to the vehicle design database (VDD) 46, and the exchange rate tool 40 receives exchange rate information from the accounting system database (ASD) 48 and the plant production actuals database (PPAD) 50 to accomplish the desired exchange rate calculations. Other databases are accessible by the toolbox 32 such as a volumes database (VD) 52 which provides volume information to the toolbox 32 and a product definition database (PDD) 53 which provides product definition information to the toolbox. The results generated by the toolbox 32 may be deposited in one or two database storage facilities such as the projection engine forecast database (PEFD) 54 and data warehouse database (DWD) 56.

Figure 3:
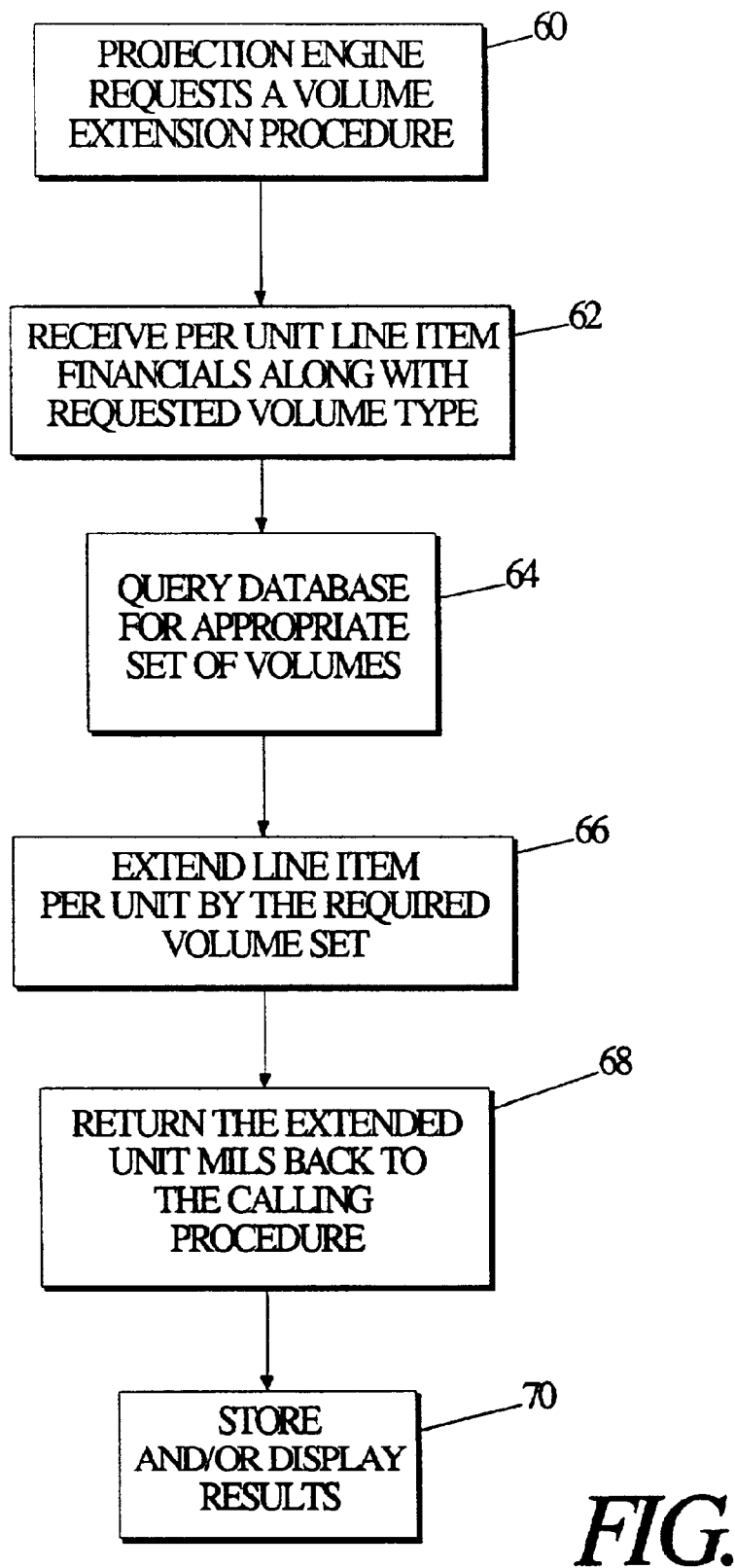
FIG. 3 is a flowchart illustrating a process for using a volume extension tool, in accordance with the present invention.

Referring now to FIG. 3, a process for determining a volume extension using projection engine 30 and toolbox 32 is illustrated, in accordance with the present invention. The process starts with the projection engine 30 requesting a volume extension from toolbox 32, as represented by block 60. The volume extension tool 34 receives the per unit line item financials along with the requested volume type from the projection engine, as represented by block 62. At block 64, the volume extension tool obtains the appropriate set of volumes from the VD database 52. The volume extension tool then extends the line item per unit by the required volume set, as represented by block 66. At block 68, the volume extension tool returns the extended unit mils to the projection engine 30. Finally, projection engine 30 stores the result in databases 54 and 56 and may also display the results to user 33, as represented by block 70.

Figure 4:
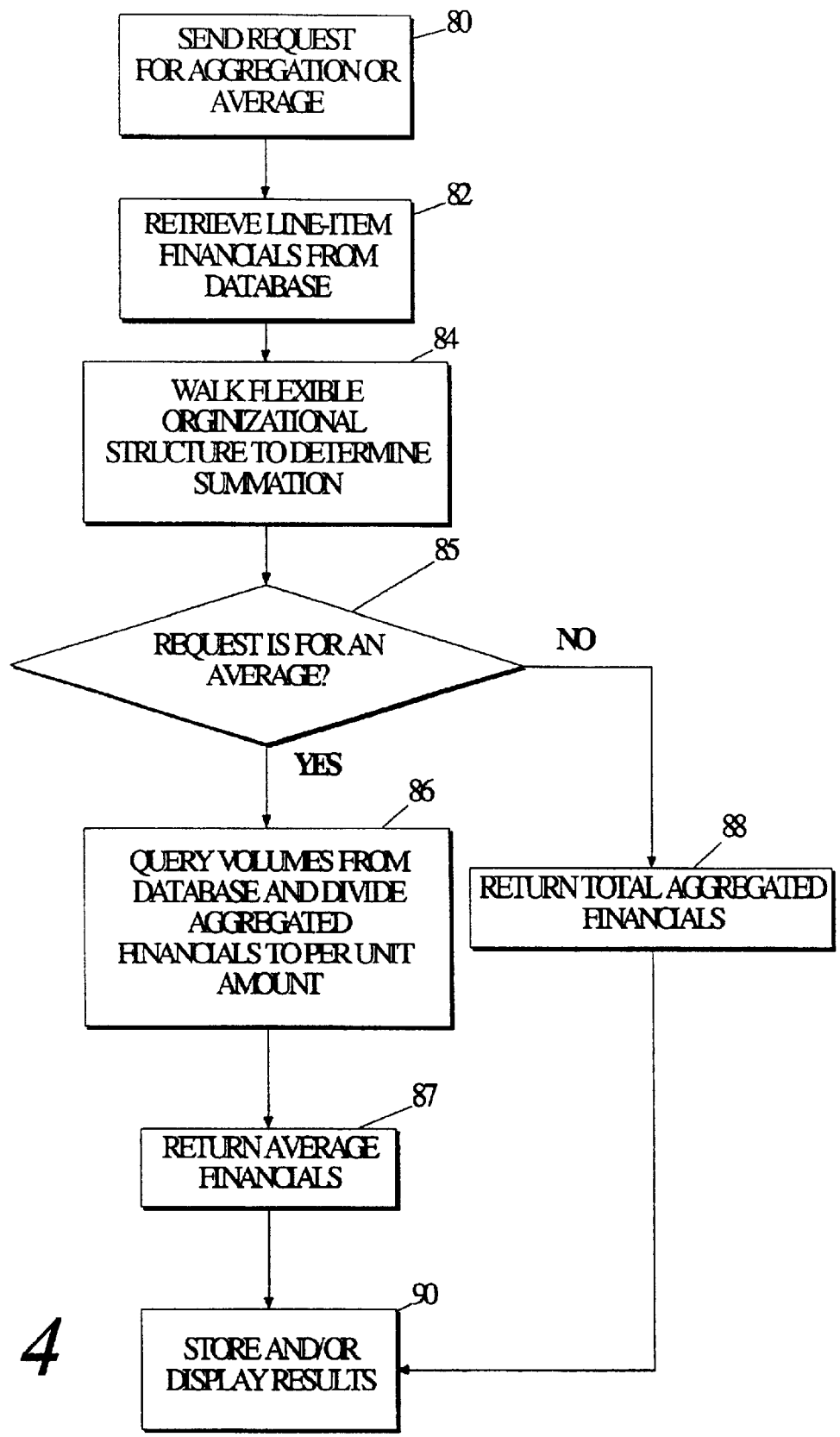
FIG. 4 is a flowchart illustrating a process for using an aggregation/average tool, in accordance with the present invention.

Referring now to FIG. 4, a process for determining an aggregate or average is illustrated, in accordance to the present invention. The process starts at block 80 wherein the projection engine 30 initiates a request for an aggregated or average view. The aggregated or average tool 36 receives the line item financials from the projection engine, as represented by block 82. At block 84, the aggregate/average tool 36 uses a flexible organizational structure to determine the summation. As indicated by block 85, if an average vehicle view is sought, then at block 86 the average tool queries the volumes from the VD database and divides aggregated financials to get the per unit amount. The average tool returns the average financials to the projection engine, at block 87. However, if an aggregation view is sought, the aggregation tool returns aggregated financials, at block 88. Finally, at block 90, the projection engine stores the results in database 54 and 56 and may present the results to the user 33.

Figure 5:
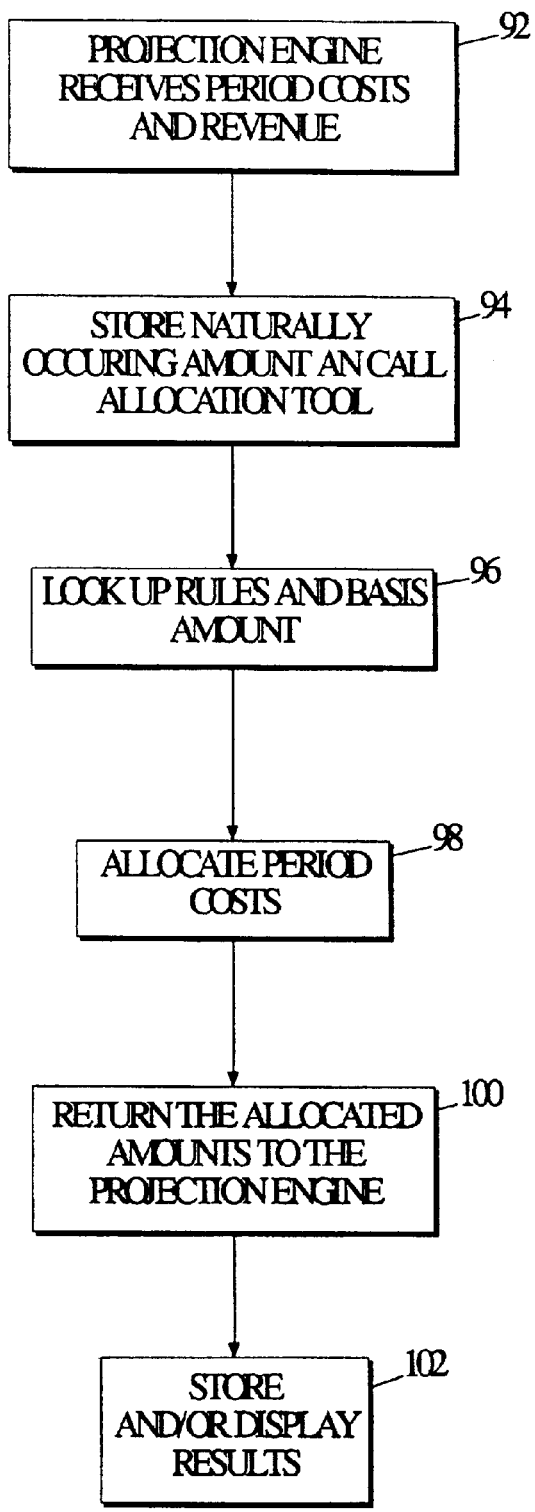
FIG. 5 is a flowchart illustrating a process for using an allocation tool, in accordance with the present invention.

Referring now to FIG. 5, a process for allocating an amount is illustrated, in accordance with the present invention. The process is initiated at block 92 where period costs and revenue amounts are sent from source systems to the projection engine 30. At block 94, the projection engine stores naturally occurring amounts and calls the allocation tool 38. The allocation tool looks up the allocation rules and basis amount for configured vehicle, as represented at block 96. At block 98, the allocation of period cost to the configured vehicle by market and source is executed. At block 100, allocation tool 38 returns the allocated amounts by configured vehicle view with input source to the projection engine 30. Finally, at block 102, projection engine stores the allocated line items for future reports and requests.

Figure 6:
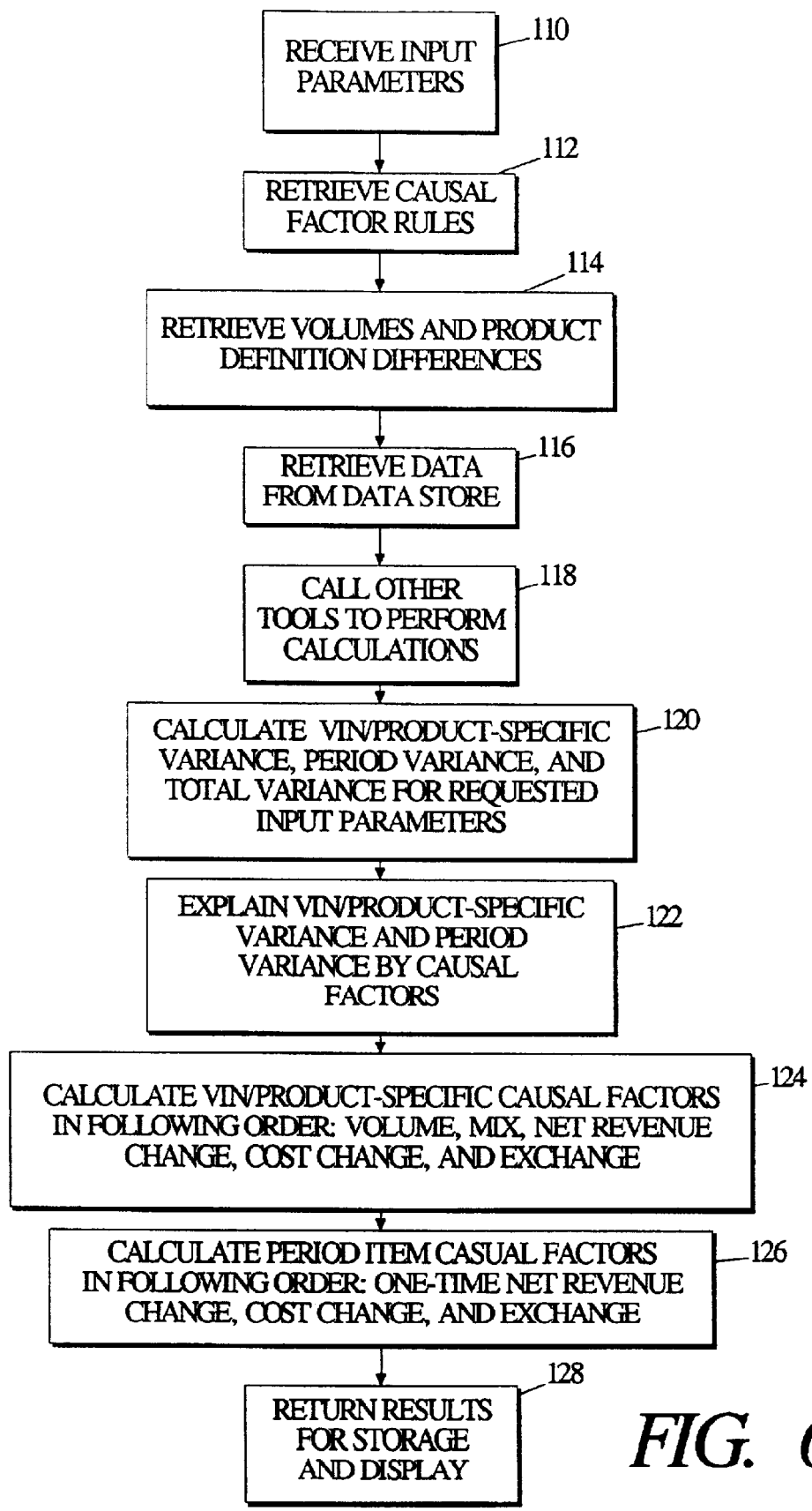
FIG. 6 is a flowchart illustrating a process for using a variance tool, in accordance with the present invention.

Referring now to FIG. 6, a variance tool process is illustrated, in accordance with the present invention. The process is initiated at block 110 where the variance tool 42 receives the following input parameters from projection engine 30: view type, time periods, line items, and issue number. At block 112, the variance tool retrieves causal factor rules from the projection engine data model. The variance tool 42 obtains volumes and product definition differences from the VD and the PDD databases 52 and 53. At block 116, data is retrieved from the projection engine data store database 54. The variance tool, at block 118 calls the volume extension tool aggregation/averaging tool, and exchange rate tool to perform required calculations. At block 120, VIN\product-specific variance, period variance, and total variance for requested line item is calculated. VIN\product-specific variance and period variance by causal factors is explained, at block 122. At block 124, vehicle specific causal factors are calculated in the following order: volume, mix, net revenue change, cost change, and exchange. At block 126, period item causal factors are calculated in the following order: one-time, net revenue change, cost change, and exchange. Finally, at block 128, the output is returned to the projection engine for presentation and storage.

Figure 7:
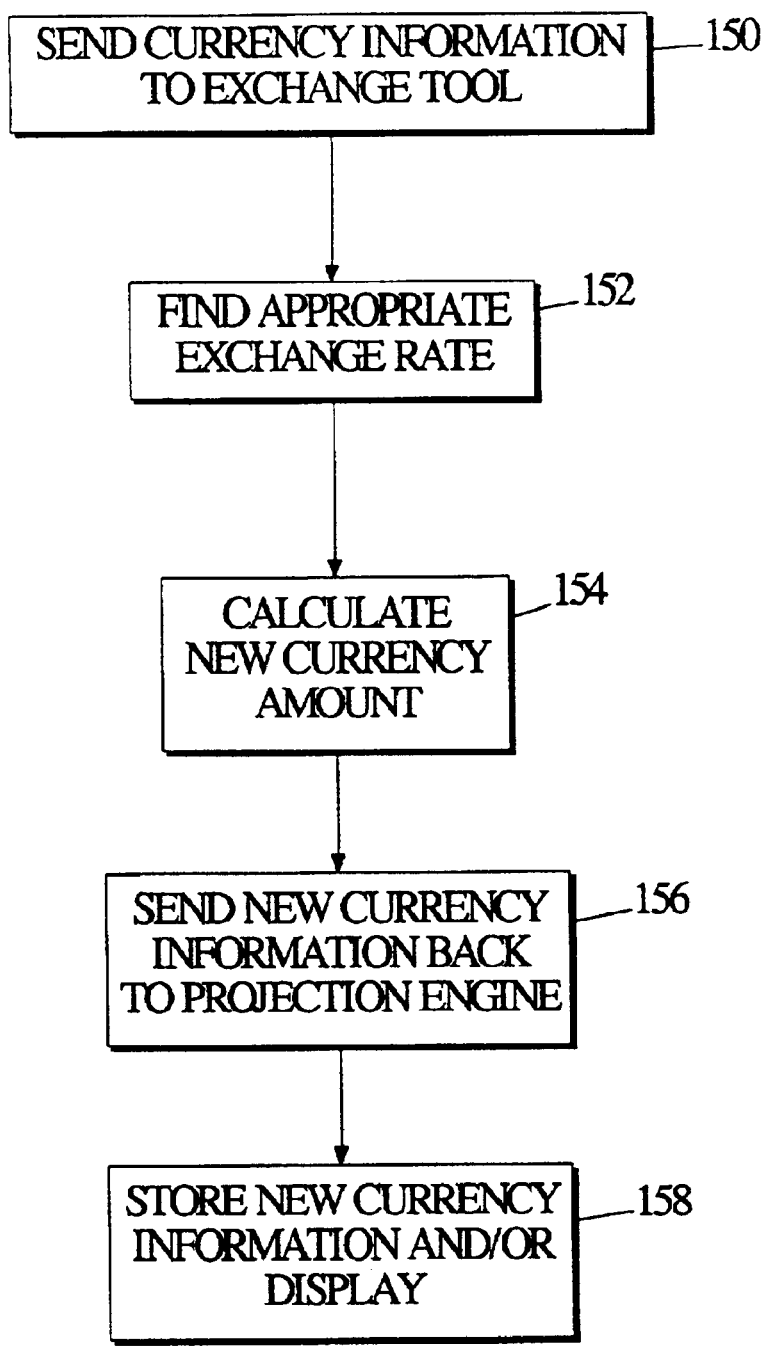
FIG. 7 is a flowchart illustrating a process for using an exchange rate tool, in accordance with the present invention.

Referring now to FIG. 7, a process for converting an amount from one currency to another currency is illustrated, in accordance with the present invention. The process is initiated at block 150 where the projection engine 30 sends current currency information including currency type, amount and desired target currency type to the exchange tool 40. At block 152, the exchange tool 40 locates the appropriate currency exchange rate in the ASD and PPAD databases. A new currency is calculated using the appropriate currency exchange rate, as represented at block 154. At block 156, exchange tool 40 returns the new currency information including currency type and amount to the projection engine 30. Finally, at block 158, projection engine 30 stores the new currency information for future reports and requests and/or returns result to user 33.

While the best mode for carrying out the invention has been described in detail, those familiar with the art to which this invention relates will recognize various alternative designs and embodiments for practicing the invention as defined by the following claims.

What is claimed is:

1. A computer-implemented method for automotive financial analysis, the method comprising:
 receiving a plurality of data relating to vehicle manufacturing and sales including operating cost data and balance sheet data;
 generating vehicle-specific financial data based on the operating cost data and balance sheet data;
 receiving the vehicle-specific data into a vehicle financial projection engine having a plurality of financial tools for calculating one or more results, the tools including:
 (i) a volume extension tool for calculating projected vehicle sales based on the vehicle-specific data, wherein the volume extension tool calculation includes receiving per unit line item financial data and a requested volume type, querying a volumes database to obtain actual volumes for the requested volume type, extending the per unit line item by the requested volume type, and returning extended per unit line items to the financial projection engine;
 (ii) an aggregation/average tool for calculating an aggregate or average of the vehicle-specific data;
 (iii) an allocation tool for calculating financial allocation amounts by vehicle;
 (iv) an exchange tool for converting currency amounts; and
 (v) a variance tool for calculating variance based on results calculated by the volume extension tool, the aggregation/average tool and the exchange rate tool; and
 displaying one or more of the results calculated by the vehicle financial projection engine.

2. The method of claim 1 wherein the financial allocation calculation includes receiving vehicle configuration information, period cost information and revenue amount information, querying a table of allocation rules and basis amount for the vehicle configuration, allocating period cost to the vehicle configuration by market and source, and returning the allocated amounts by vehicle configuration to the financial projection engine.

3. The method of claim 1 wherein the variance calculation is additionally based on view type information, time period information, line item information, one or more issue numbers, one or more casual factor rules, vehicle volume information and product definition information.

4. The method of claim 1 wherein the calculated variance includes a vehicle-specific variance.

5. The method of claim 1 wherein the calculated variance includes a variance for a given period.

6. The method of claim 1 wherein the calculated variance includes a total variance for a requested line item.

7. The method of claim 1 additionally comprising receiving user input defining one or more forecast assumptions and one or more physical assumptions, wherein one or more of the results are calculated based on one or more of the assumptions.

* * * * *